(12) United States Patent  (10) Patent No.: US 9,315,227 B2
Hayashi et al.  (45) Date of Patent: Apr. 19, 2016

(54) HOUSING STRUCTURE IN SADDLE TYPE VEHICLE

(71) Applicant: HONDA MOTOR CO., LTD., Tokyo (JP)

(72) Inventors: Takazumi Hayashi, Wako (JP); Shinobu Saito, Wako (JP); Hiroaki Tsukui, Wako (JP); Takatsugu Kido, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 14/063,339

(22) Filed: Oct. 25, 2013

(65) Prior Publication Data

US 2014/0117655 A1  May 1, 2014

(30) Foreign Application Priority Data

Oct. 30, 2012 (JP) ................. 2012-238618

(51) Int. Cl.
*B62J 35/00* (2006.01)
*B62K 19/30* (2006.01)
*B60R 7/02* (2006.01)
*B60K 15/05* (2006.01)
*B62J 9/00* (2006.01)
*B62J 23/00* (2006.01)
*B62K 11/04* (2006.01)
*B62K 19/46* (2006.01)

(52) U.S. Cl.
CPC ................. *B62J 35/00* (2013.01); *B60K 15/05* (2013.01); *B60R 7/02* (2013.01); *B62J 9/008* (2013.01); *B62J 23/00* (2013.01); *B62K 11/04* (2013.01); *B62K 19/30* (2013.01); *B62K 19/46* (2013.01)

(58) Field of Classification Search
CPC ................. B60K 2015/0553; B60K 2015/053; B60K 15/05; B62K 19/456; B62J 35/00
USPC .......................... 296/37.1, 24.34, 37.8, 181.4
See application file for complete search history.

(56) References Cited

U.S. PATENT DOCUMENTS

| | | | | | |
|---|---|---|---|---|---|
| 3,937,484 | A | * | 2/1976 | Morioka et al. | 180/219 |
| 3,944,009 | A | * | 3/1976 | Katagiri | 180/219 |
| 4,830,134 | A | * | 5/1989 | Hashimoto | 180/219 |
| 4,940,111 | A | * | 7/1990 | Nogami et al. | 180/219 |
| 5,577,747 | A | * | 11/1996 | Ogawa et al. | 180/220 |

(Continued)

FOREIGN PATENT DOCUMENTS

| | | | |
|---|---|---|---|
| EP | 2213560 A1 | * | 8/2010 |
| JP | 02081779 A | * | 3/1990 |

(Continued)

*Primary Examiner* — Joseph Rocca
*Assistant Examiner* — Daniel Yeagley
(74) *Attorney, Agent, or Firm* — Birch, Stewart, Kolasch & Birch, LLP

(57) ABSTRACT

A housing structure for a saddle type vehicle wherein the housing structure is not limited by the size of an opening/closing lid (shelter lid) for a fuel tank. The housing structure can provide a space for storage wherein the shelter lid is easily opened even when a heavy item is stored in the space. A tank shelter is formed by a cover that can be divided into a plurality of covers. A housing pocket is fixed to the inside of the tank shelter. A loading and unloading opening in the housing pocket faces an opening portion of the tank shelter. A dimension in a direction of vehicle width of the housing pocket is larger than a width of the opening portion of the tank shelter.

14 Claims, 18 Drawing Sheets

(56) References Cited

U.S. PATENT DOCUMENTS

| | | | |
|---|---|---|---|
| 6,499,784 B2 * | 12/2002 | Takahashi | 296/37.1 |
| 6,588,529 B2 * | 7/2003 | Ishii et al. | 180/219 |
| 8,726,888 B2 * | 5/2014 | Yoshida et al. | 123/519 |
| 8,746,391 B2 * | 6/2014 | Atsuchi et al. | 180/220 |
| 2002/0189877 A1 * | 12/2002 | Yagisawa et al. | 180/219 |
| 2008/0156562 A1 * | 7/2008 | Yano et al. | 180/219 |

FOREIGN PATENT DOCUMENTS

| | | |
|---|---|---|
| JP | 03109183 A * | 5/1991 |
| JP | 2009-101755 A | 5/2009 |

* cited by examiner

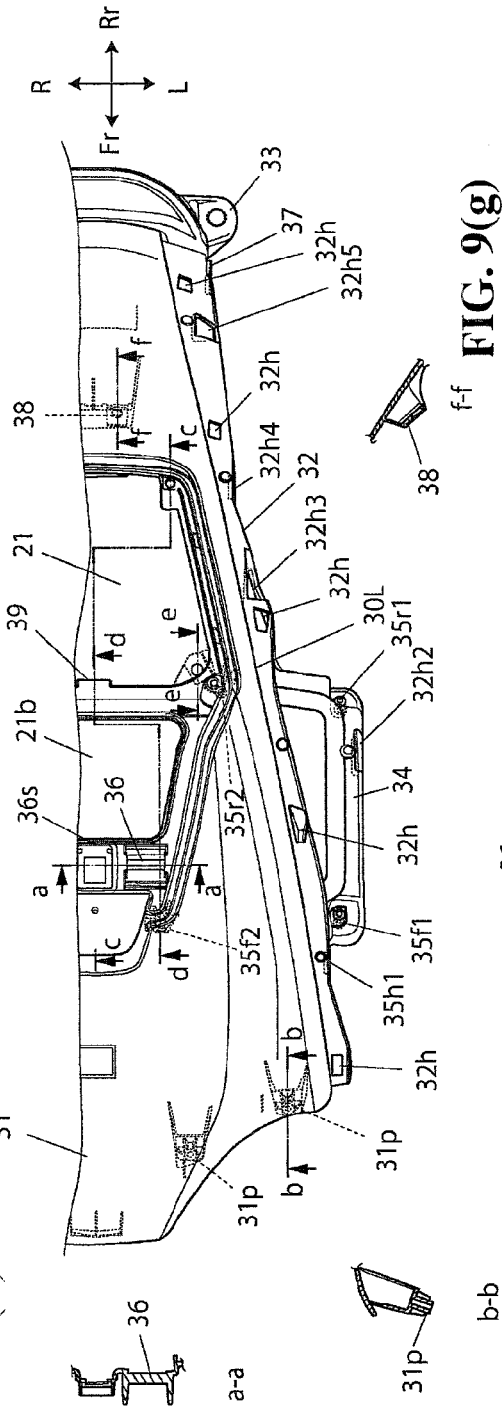

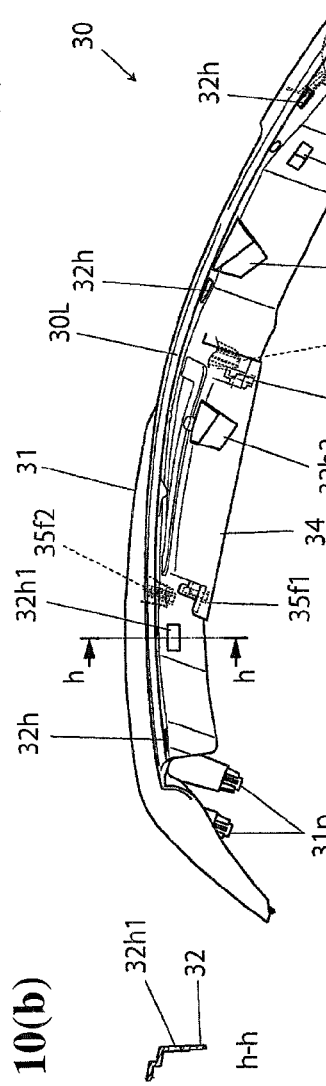
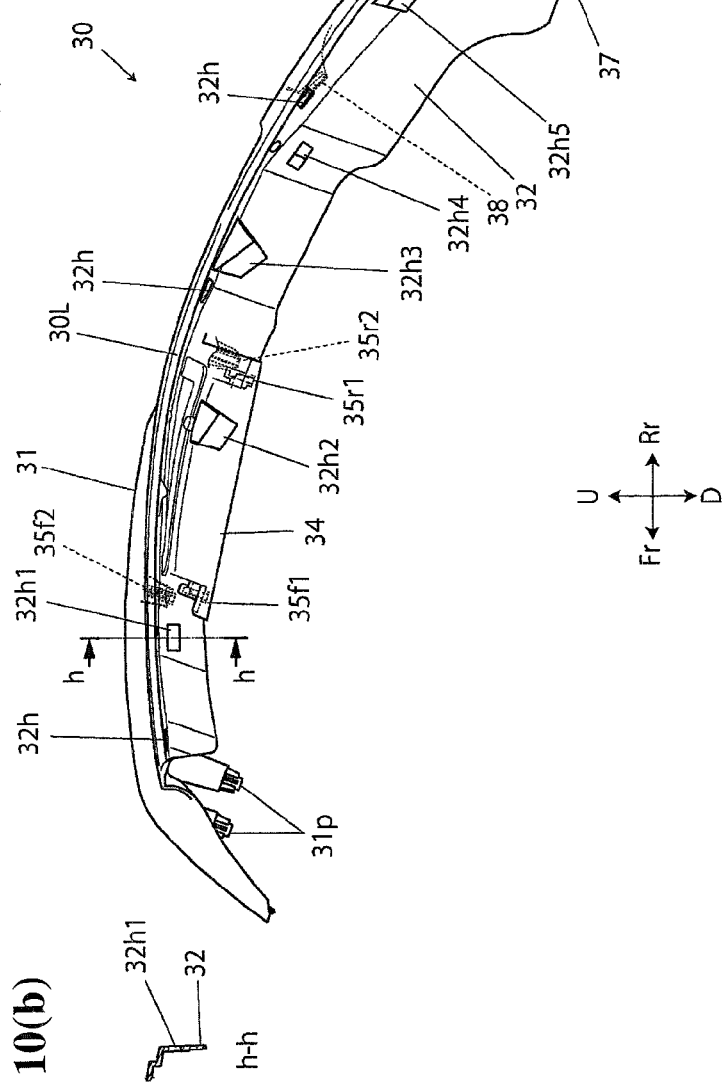
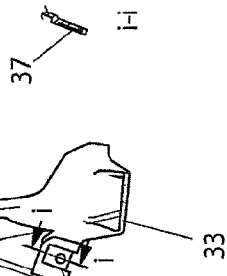
FIG. 10(a)
FIG. 10(b)
FIG. 10(c)

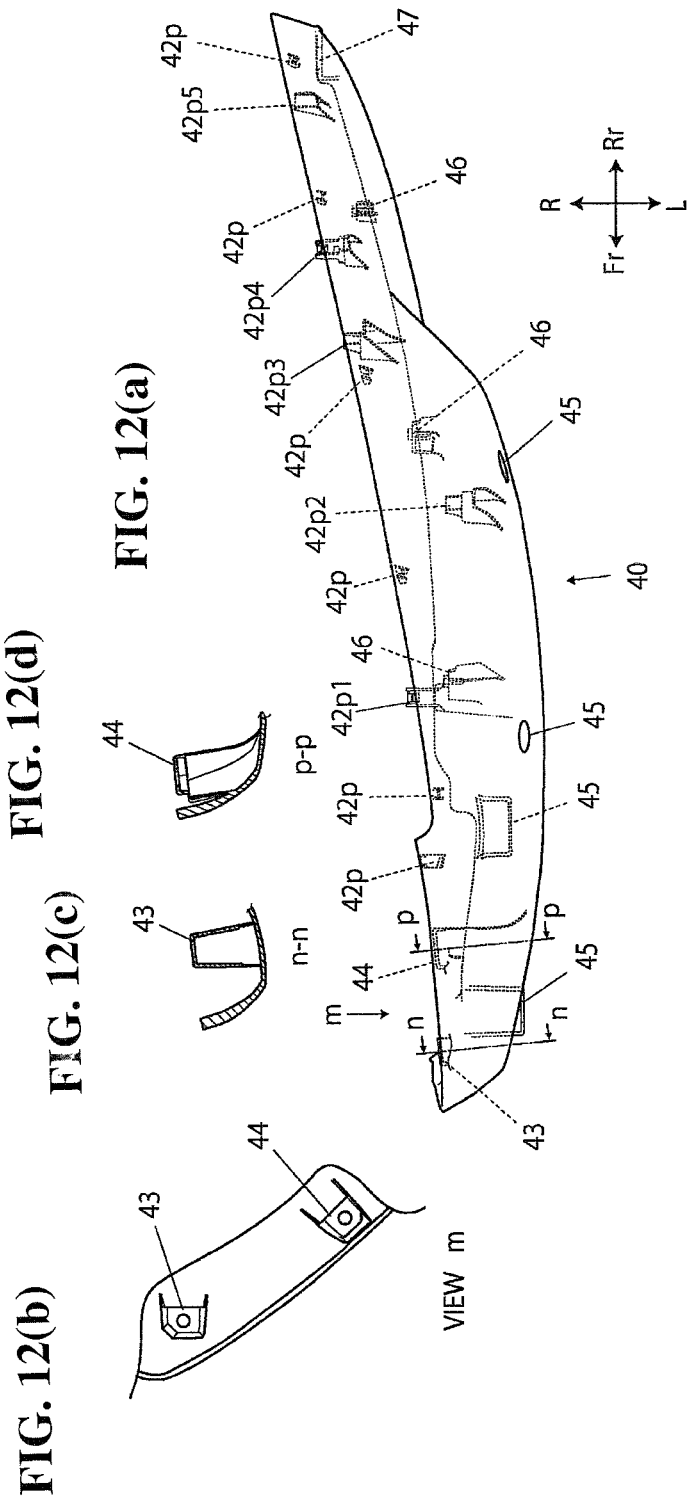

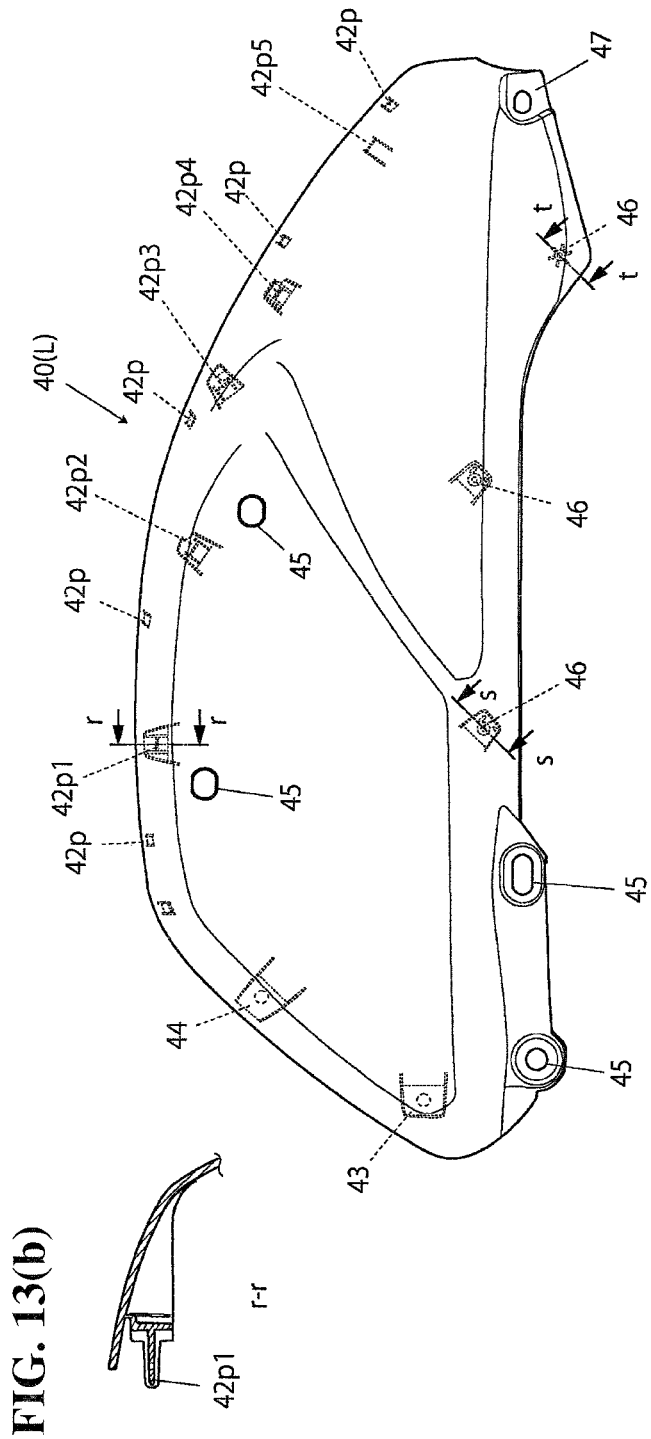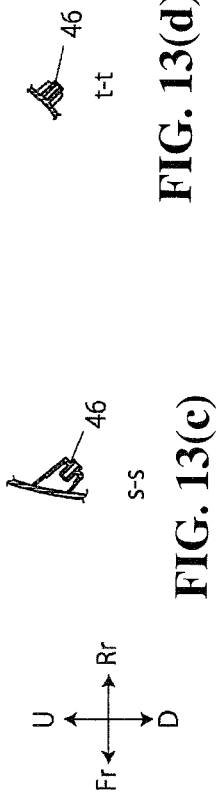

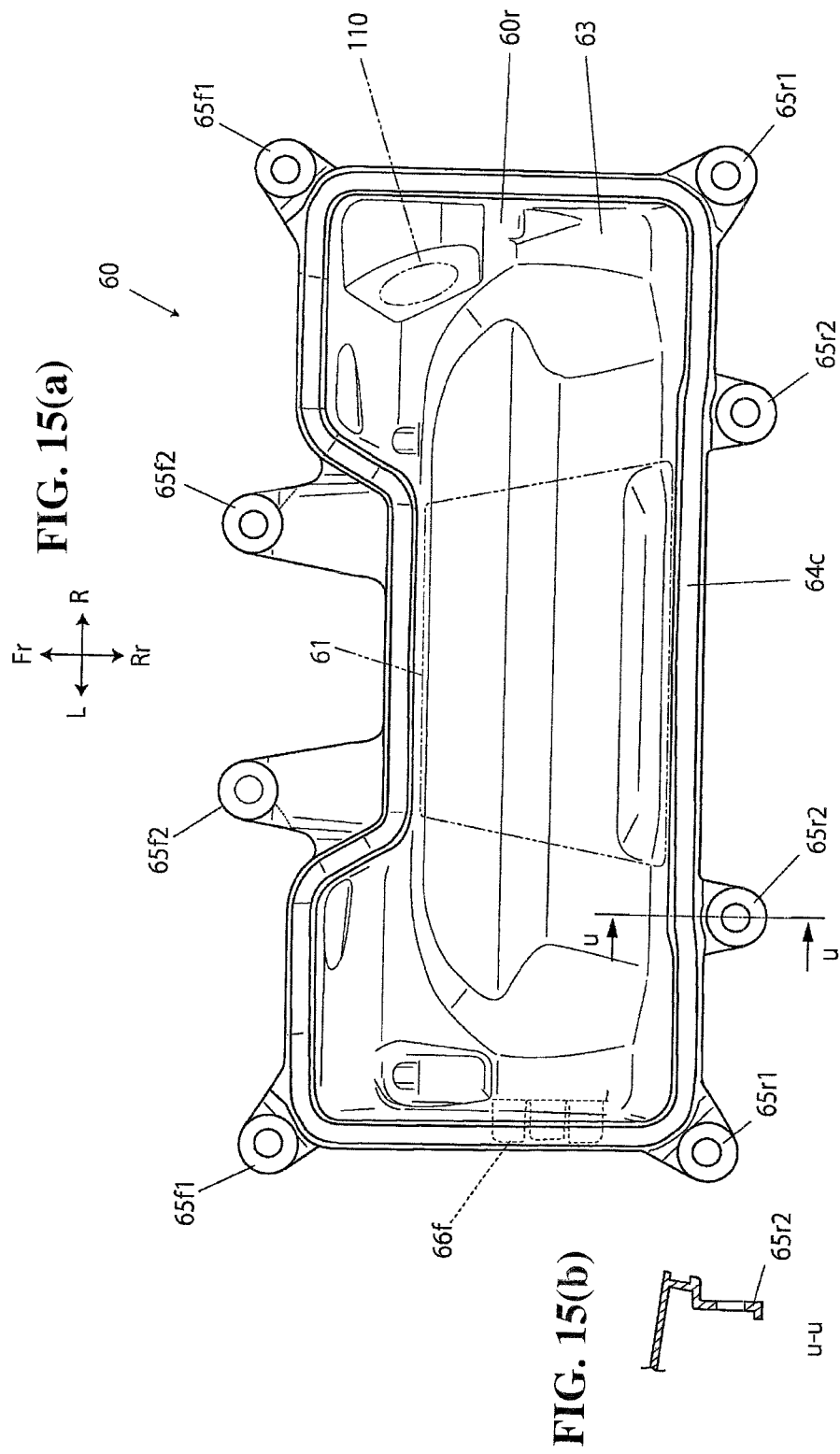

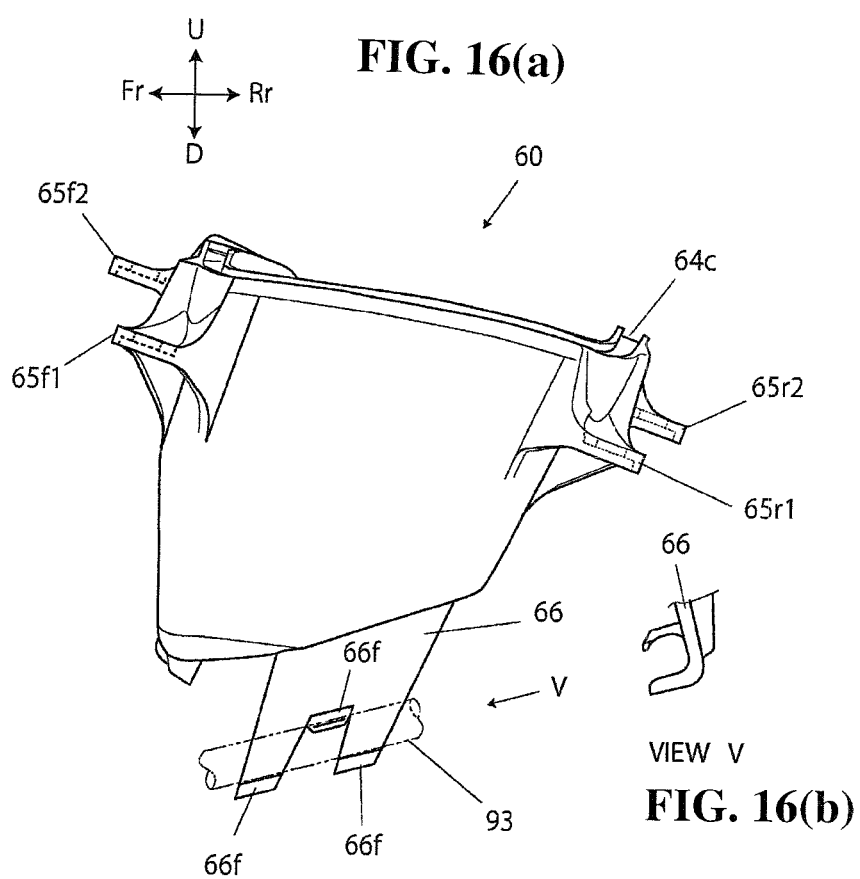

y-y x-x z-z

HOUSING STRUCTURE IN SADDLE TYPE VEHICLE

CROSS-REFERENCE TO RELATED APPLICATIONS

The present application claims priority under 35 USC 119 to Japanese Patent Application No. 2012-238618 filed Oct. 30, 2012 the entire contents of which are hereby incorporated by reference.

BACKGROUND OF THE INVENTION

1. Field of the Invention

The present invention relates to a housing structure for a saddle type vehicle.

2. Description of Background Art

A housing structure for a saddle type vehicle is known. See, for example, Japanese Patent Laid-Open No. 2009-101755 that discloses an opening portion (9b) wherein a fuel filler (29a) of a fuel tank (29) faces that is provided in a shelter (9) with an opening/closing lid (70) for the fuel tank being provided on the opening portion (9b). A space for storage (tray 83) is provided inside the opening/closing lid (70) for the fuel tank.

The above-described conventional housing structure for the saddle type vehicle includes the tray (83) for storage that is inside the opening/closing lid (70) for the fuel tank. Therefore, the tray (83) cannot be made larger than the opening/closing lid (70) for the fuel tank with respect to the forward-rearward direction and width direction of the vehicle. Thus, the housing space is limited by the size of the opening/closing lid (70) for the fuel tank.

There is another drawback in that it is difficult to open the opening/closing lid (70) for the fuel tank when a heavy item is placed in the tray (83). For this drawback, biasing with a damper is conceivable. However, this is expected to make it difficult to close the opening/closing lid (70) for the fuel tank when the tray (83) is not used.

SUMMARY AND OBJECTS OF THE INVENTION

It is an object of an embodiment of the present invention to provide a housing structure in a saddle type vehicle wherein the housing structure is not limited by the size of the opening/closing lid (shelter lid) for the fuel tank and which housing structure can provide a space for storage from which space the shelter lid is opened easily even when a heavy item is stored in the space.

In order to solve the above problems, according to an embodiment of the present invention, there is provided a housing structure in a saddle type vehicle wherein the housing structure includes a tank shelter (20) located between handlebars (11) rotated and steered by an occupant and a seat (12) straddled by the occupant, the tank shelter (20) smoothly covering an upper surface and both side surfaces of the vehicle (1) between the handlebars (11) and the seat (12) with a fuel tank (70) for storing fuel that is supplied to an engine (E). At least a fuel filler (71) of the fuel tank (70) is opened upwardly within the tank shelter (20) with a shelter lid (50) for opening and closing an opening portion (21) opened in an upper surface of the tank shelter (20) in accordance with the fuel filler (71). A housing pocket (60) is provided into and out of which a load can be put when the shelter lid (50) is opened. The housing pocket (60) is a compartment dividing a space within the tank shelter (20), wherein the housing pocket (60) is provided inside the tank shelter (20). A loading and unloading opening (61) in the housing pocket (60) faces the opening portion (21) of the tank shelter (20) with a dimension (W2) in a direction of vehicle width of the housing pocket (60) being larger than a width (W1) of the opening portion (21) of the tank shelter (20).

According to an embodiment of the present invention, the housing pocket (60) is provided inside the tank shelter (20) with the loading and unloading opening (61) in the housing pocket (60) facing the opening portion (21) of the tank shelter (20). Thus, a space (S) for storage is obtained by the housing pocket (60) that is not limited by the size of the shelter lid (50). Thus, a space (S) for storage is obtained in the shelter lid (50) that is opened easily even when a heavy item is stored in the space (S).

According to an embodiment of the present invention, the housing structure in the saddle type vehicle can further include a pocket lid (62) for opening and closing the loading and unloading opening (61) of the housing pocket (60).

Such a construction can prevent fuel from being splashed onto a load within the housing pocket (60) at a time of refueling.

According to an embodiment of the present invention, the housing structure in the saddle type vehicle includes the housing pocket (60) that is fixed to an inside of the tank shelter (20). In addition, the housing structure further includes an annularly continuous housing pocket seal (64) for sealing an opening portion (63) of the housing pocket (60) in relation to the tank shelter (20) with an annularly continuous pocket lid seal (62s) for sealing an opening portion (21b) in the tank shelter (20). The opening portion (21b) communicates with the housing pocket (60), in relation to the pocket lid (62).

With such a construction, the space within the housing pocket (60) is divided from the fuel tank (70).

According to an embodiment of the present invention, in the housing structure in the saddle type vehicle, the tank shelter (20) is a three-division structure of a center portion (30) and two side portions (40(L) and 40(R)), the opening portion (21) is opened in the center portion (30), and the width (W1) of the opening portion (21) is set smaller than a width between joints (30L) and (30R) joined to the two side portions (40(L) and 40(R)) in the center portion (30). In addition, the housing pocket (60) is fixed to an inside of the center portion (30) with the dimension (W2) in the direction of vehicle width of the housing pocket (60) being larger than the width between the joints (30L) and (30R) joined to the two side portions (40(L) and 40(R)) in the center portion (30).

Such a construction improves attachment accuracy because the housing pocket (60) is attached to one part (center portion (30)).

According to an embodiment of the present invention, in the saddle type vehicle, there is generally a desire to construct the tank shelter (20) from a plurality of divided parts because the tank shelter (20) is a relatively large part covering the upper surface and both side surfaces of the vehicle.

According to an embodiment of the present invention, the tank shelter (20) is the three-division structure of the center portion (30) and the two side portions (40(L) and 40(R)). Therefore, the tank shelter (20) can be manufactured easily.

On the other hand, the opening portion (21) opposed to the fuel filler (71) of the fuel tank (70) needs to be provided to the tank shelter (20). There is another desire to house the opening portion (21) in one part without the opening portion (21) straddling a plurality of parts in consideration of the continuousness (juncture and fitting accuracy) of the surface of the shelter. Thus, there is a limitation on the width of the opening portion.

In order to deal with this, according to an embodiment of the present housing structure, the housing pocket (60) is fixed to the inside of the center portion (30) of the tank shelter (20). Therefore the width (W2) of the housing pocket (60) can be made to be larger than the width (W1) of the opening portion (21). In addition, because the loading and unloading opening (61) in the housing pocket (60) faces the opening portion (21) of the tank shelter (20), the ease of loading and unloading can be enhanced.

According to an embodiment of the present invention, in the housing structure in the saddle type vehicle, the center portion (30) of the tank shelter (20) has an eaves portion (34) under the joints (30L) and (30R) joined to the side portions (40(L) and 40(R)), the eaves portion (34) extending according to a length in the direction of vehicle width of the housing pocket (60), and the housing pocket (60) being fixed to the eaves portion (34).

Such a construction allows the dimension (W2) in the direction of vehicle width of the housing pocket (60) to be larger than the width between the joints (30L) and (30R) joined to the two side portions (40(L) and 40(R)) in the center portion (30), and at the same time, the fixing of the housing pocket (60) to the eaves portion (34) provides a stable fixed state of the housing pocket (60) fixed to the center portion (30) and a stable property of sealing the housing pocket (60).

In addition, the housing pocket (60) can be formed without an upper surface (opened upwardly), and can therefore be molded easily. Thus, the need for a slide mold is eliminated.

In the housing structure in the saddle type vehicle, the fuel tank (70) is disposed to a rear of the tank shelter (20), the housing pocket (60) is disposed in a region (A1) obtained by obliquely cutting a front side of the fuel filler (71) of the fuel tank (70), and the loading and unloading opening (61) is opened in a vicinity of the fuel filler (71).

Such a construction allows the housing pocket (60) to be disposed while a region as an air layer portion in the fuel tank (70) (region (A1) obtained by obliquely cutting the front side of the fuel filler) is utilized effectively. In addition, at the same time, the fuel filler (71) and the loading and unloading opening (61) are brought close to each other. Thus, the shelter lid (50) can be miniaturized.

In the housing structure in the saddle type vehicle, an accessory socket (110) is provided to the housing pocket (60), and the accessory socket (110) is disposed in a side wall (60r) on an opposite side of the housing pocket (60) from a side stand (15) provided to the vehicle with respect to a left-right direction of the vehicle.

Such a construction allows a portable telephone or the like to be charged, for example, using the accessory socket (110). The accessory socket (110) is disposed in the side wall (60r) a distant from the loading and unloading opening (61) of the housing pocket (60). Thus, the accessory socket (110) is not easily exposed to rain. In addition, the accessory socket (110) is disposed in the side wall (60r) on the opposite side of the housing pocket (60) from the side stand (15) provided to the vehicle with respect to the left-right direction of the vehicle. Thus, rainwater does not flow into the accessory socket (110) during a stop.

In the housing structure in the saddle type vehicle, a downward hanging wall (21f) is disposed on a periphery of the opening portion (21) in the tank shelter (20) with a refueling tray (90) being disposed around the fuel filler (71) on an upper surface of the fuel tank (70) to receive a spilt fuel that is larger in size than the opening portion (21) as viewed in plan. In addition, a height of an upper end (92) of an upward peripheral wall (91) of the refueling tray (90) is equal to or smaller than a height of a lower end (21f1) of the hanging wall (21f) of the opening portion (21).

Such a construction eliminates a fear of the hanging wall (21f) of the tank shelter (20) and the peripheral wall (91) of the refueling tray (90) interfering with each other. Thus, the need to increase dimensional accuracy of both of the hanging wall (21f) of the tank shelter (20) and the peripheral wall (91) of the refueling tray (90) is eliminated. In addition, opening the shelter lid (50) and looking inside does not easily reveal the tank main body, so that a simple appearance is presented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a partially omitted left side view of the tank shelter 20, the housing pocket 60, a fuel tank 70, and the like;

FIGS. 9(a) to 9(g) are diagrams showing the center portion 30, 9(a) being a partially omitted plan view, 9(b) being a sectional view taken along a line a-a, 9(c) being a sectional view taken along a line b-b, 9(d) being a sectional view taken along a line c-c, 9(e) being a sectional view taken along a line d-d, 9(f) being a sectional view taken along a line e-e, and 9(g) being a sectional view taken along a line f-f;

FIGS. 10(a) to 10(c) are diagrams showing the center portion 30, 10(a) being a left side view, 10(b) being a sectional view taken along a line h-h, and 10(c) being a sectional view taken along a line i-i;

FIGS. 12(a) to 12(d) are diagrams showing a side portion 40(L), 12(a) being a plan view, 12(b) being a view taken in the direction of an arrow m, 12(c) being a sectional view taken along a line n-n, and 12(d) being a sectional view taken along a line p-p;

FIGS. 13(a) to 13(d) are diagrams showing the side portion 40(L), 13(a) being a left side view, 13(b) being a sectional view taken along a line r-r, 13(c) being a sectional view taken along a line s-s, and 13(d) being a sectional view taken along a line t-t;

FIGS. 15(a) and 15(b) are diagrams showing the housing pocket 60, 15(a) being a plan view, and 15(b) being a sectional view taken along a line u-u;

FIGS. 16(a) and 16(b) are diagrams showing the housing pocket 60, 16(a) being a left side view, and 16(b) being a view taken in the direction of an arrow V;

DETAILED DESCRIPTION OF THE PREFERRED EMBODIMENTS

An embodiment of a housing structure in a saddle type vehicle according to an embodiment of the present invention will hereinafter be described with reference to the drawings. In the following description, a forward-rearward direction, a left-right direction, and an up-down direction are in accordance with directions as viewed from an operator. A forward direction of the vehicle will be denoted as Fr, a rearward direction of the vehicle will be denoted as Rr, a left side of the vehicle will be denoted as L, a right side of the vehicle will be denoted as R, an upward direction of the vehicle will be denoted as U, and a downward direction of the vehicle will be denoted as D. In each of the drawings, the same parts or corresponding parts are identified by the same reference symbols.

Figure 1:
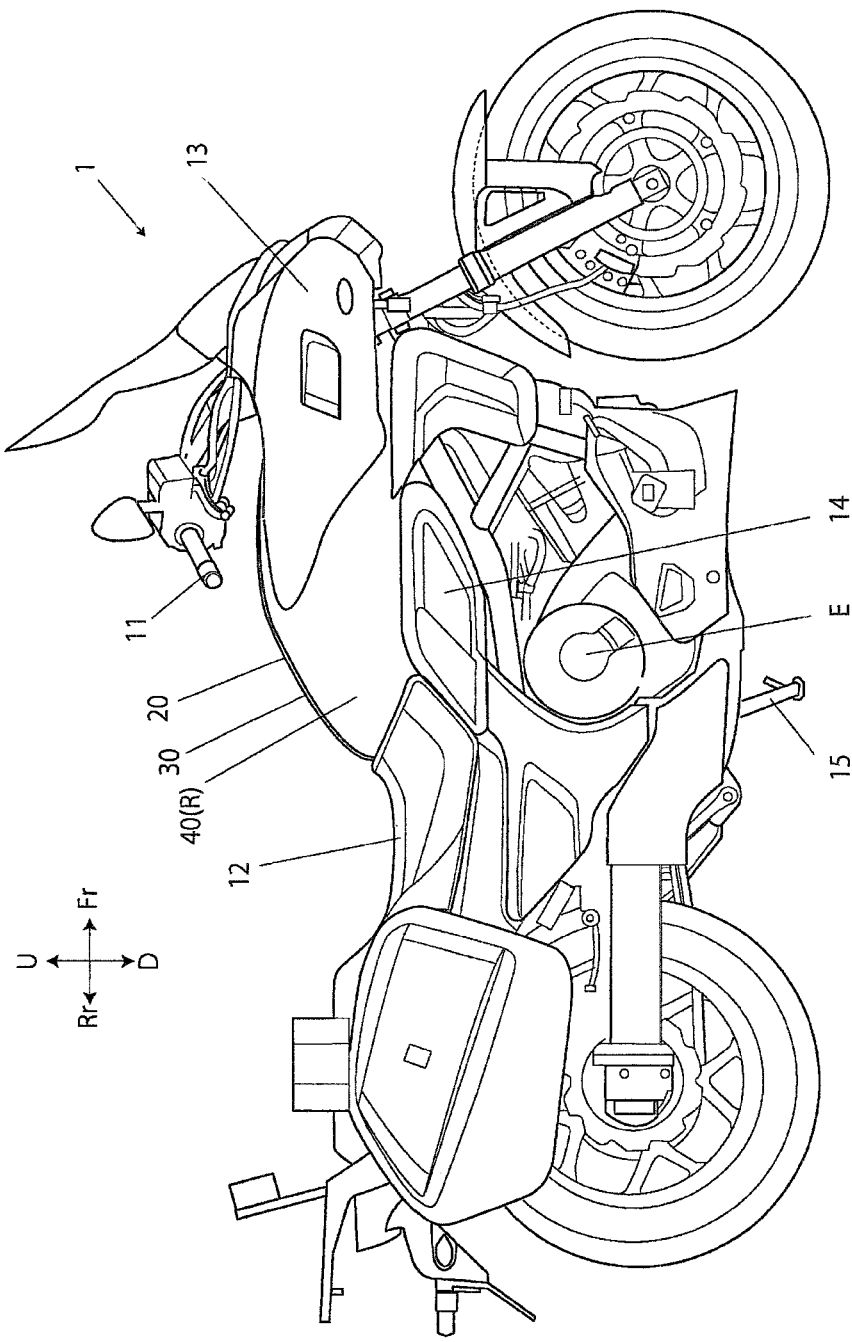
FIG. 1 is a side view of a motorcycle as an example of a saddle type vehicle to which an embodiment of a housing structure in a saddle type vehicle according to the present invention is applied.

As illustrated in FIG. 1, a motorcycle 1 includes handlebars 11 that are rotated and steered by an occupant, a seat 12 is straddled by the occupant with a tank shelter 20 being located between the handlebars 11 and the seat 12. The tank shelter 20 smoothly covers an upper surface and both side surfaces of the vehicle between the handlebars 11 and the seat 12.

Figure 6:
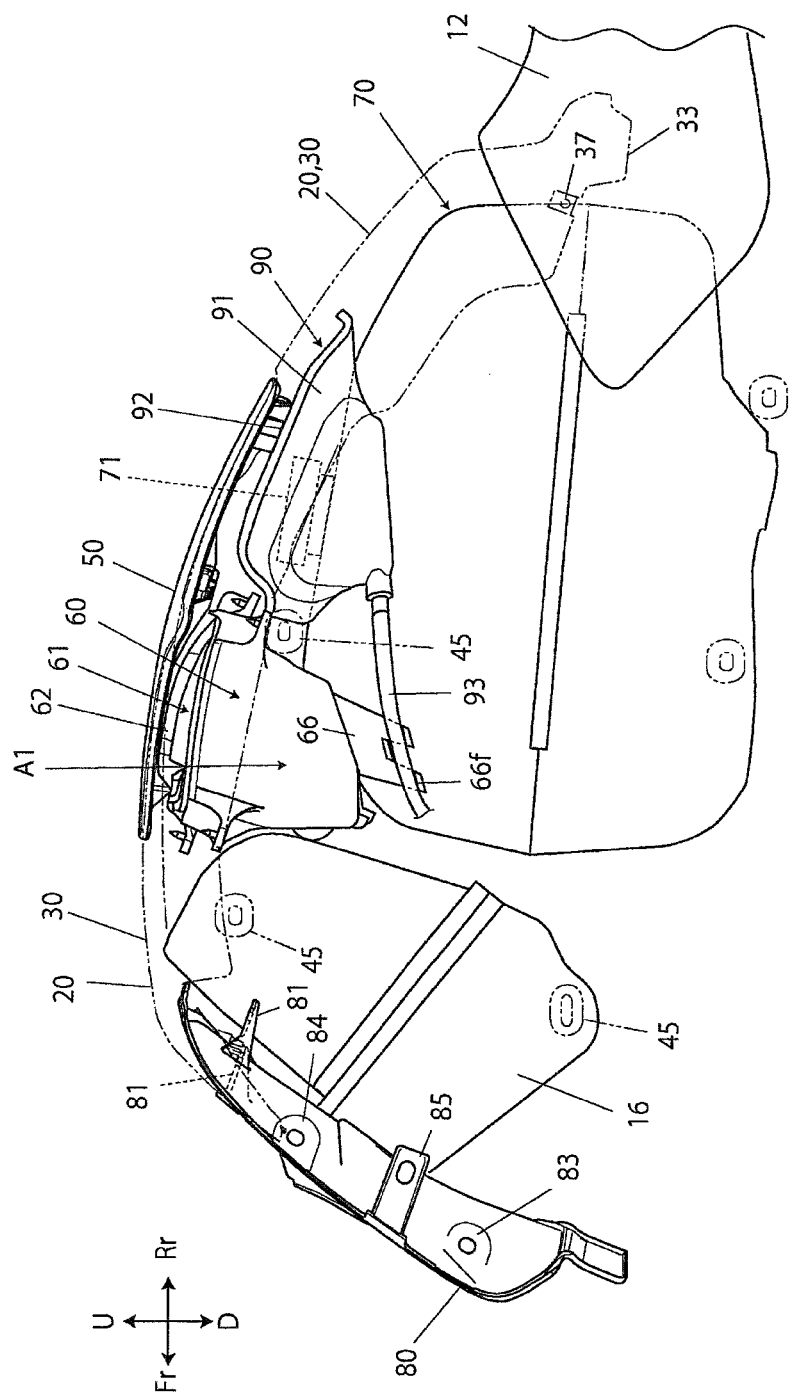

As shown in FIG. 6, the motorcycle 1 also includes a fuel tank 70, a shelter lid 50, and a housing pocket 60.

Figure 4:
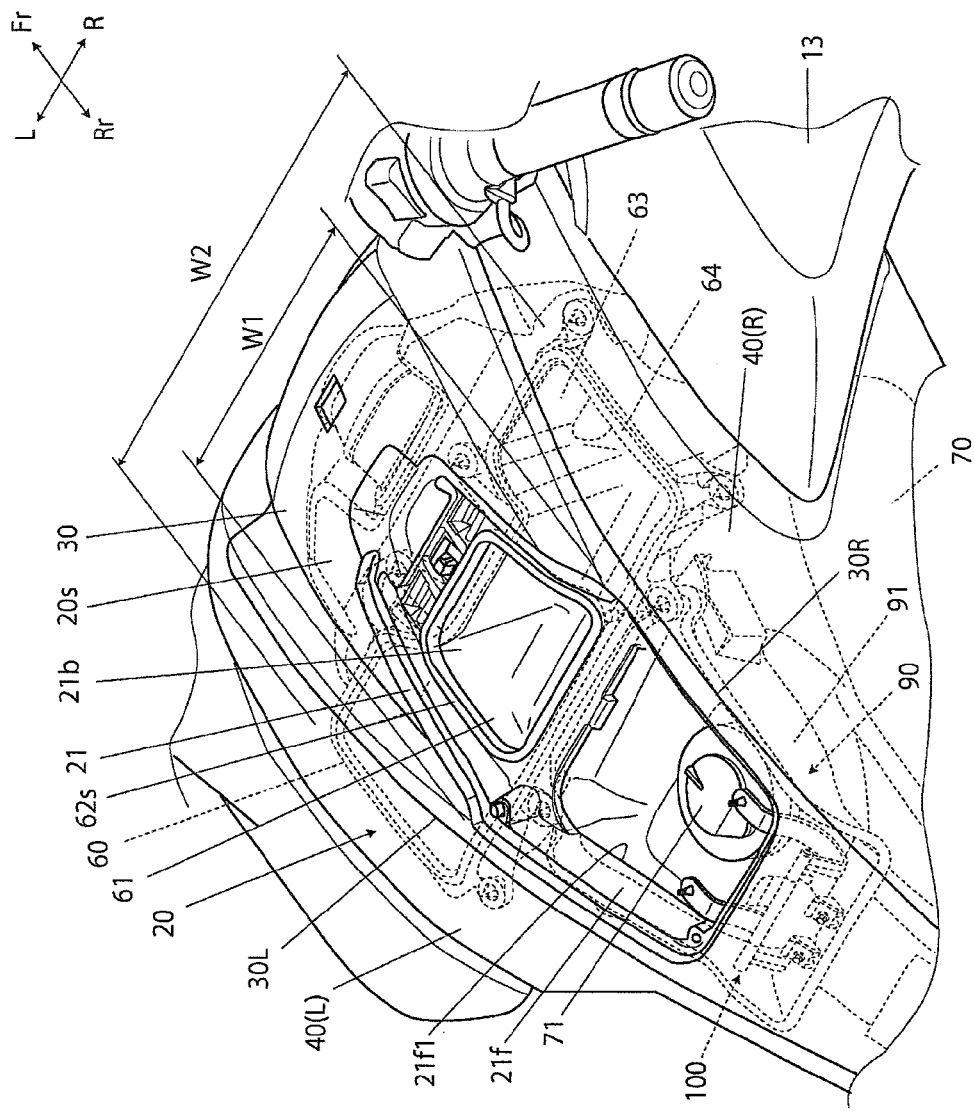
FIG. 4 is a perspective view of the tank shelter 20 with the shelter lid 50 and a pocket lid 62 removed.

The fuel tank 70 stores fuel that is supplied to an engine E. As shown in FIG. 4, a fuel filler 71 is opened upwardly within the tank shelter 20.

Figure 2:
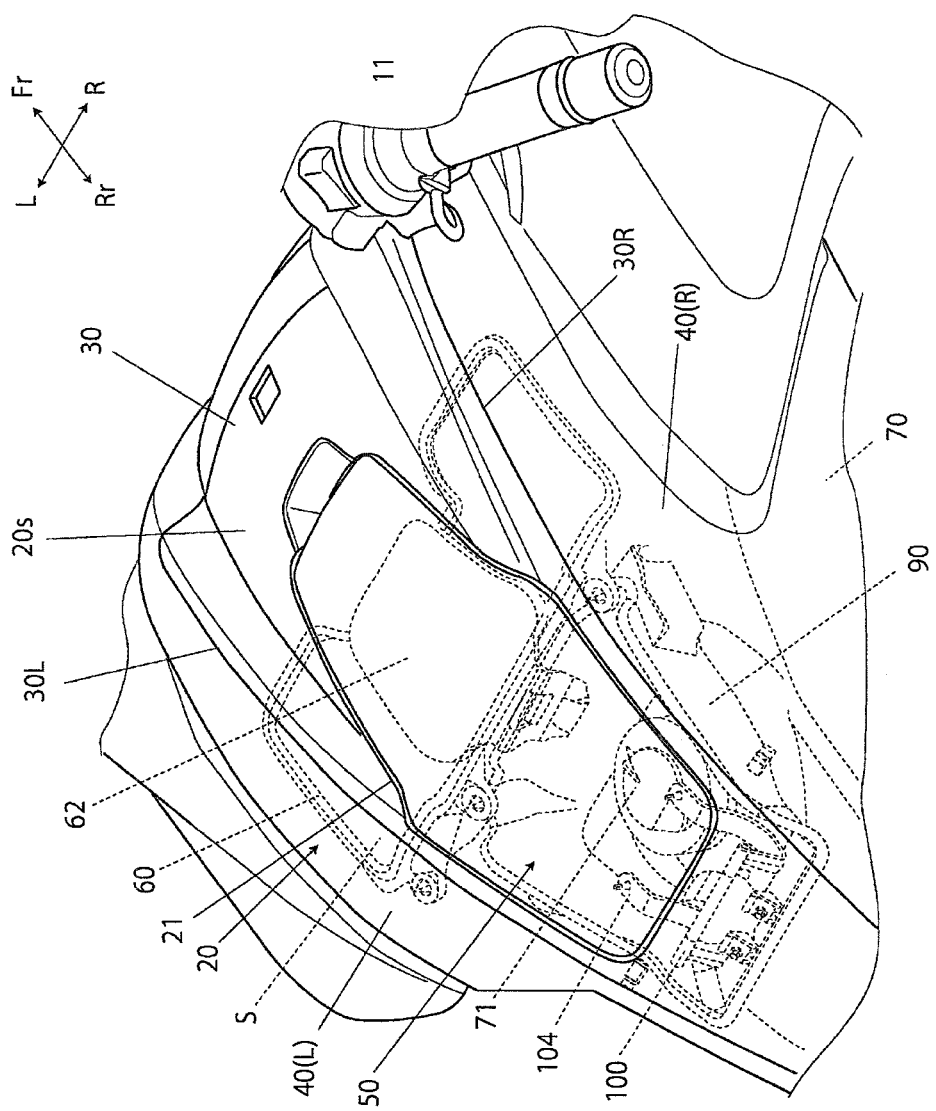
FIG. 2 is a perspective view of a tank shelter 20.
Figure 3:
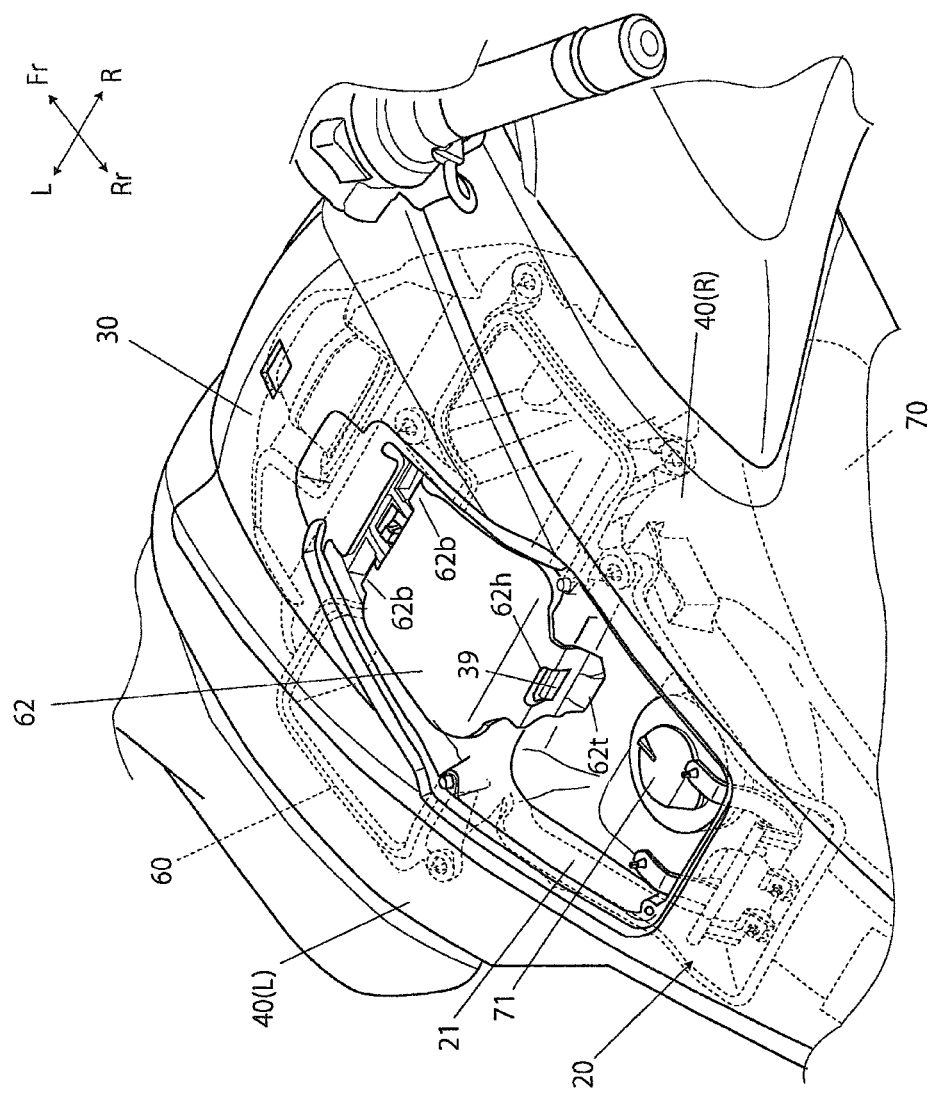
FIG. 3 is a perspective view of the tank shelter 20 with a shelter lid 50 removed.

As shown in FIGS. 2 and 3, the shelter lid 50 opens and closes an opening portion 21 opened in an upper surface 20s of the tank shelter 20 in accordance with the fuel filler 71.

The housing pocket 60 is a compartment dividing a space within the tank shelter 20. A load can be put into and out of the housing pocket 60 when the shelter lid 50 is opened.

In the case of the housing structure in the saddle type vehicle in the present embodiment, the tank shelter 20 is formed by a cover that can be divided into a plurality of covers. The divided covers 30, 40(L), and 40(R) are illustrated in FIG. 2.

In the case of the housing structure in the saddle type vehicle in the present embodiment, as shown mainly in FIG. 4, the housing pocket 60 (FIG. 5) is provided inside the tank shelter 20, a loading and unloading opening 61 in the housing pocket 60 faces the opening portion 21 of the tank shelter 20, and a dimension W2 in a direction of vehicle width of the housing pocket 60 is larger than a width W1 of the opening portion 21 of the tank shelter 20.

According to the housing structure in the saddle type vehicle, the housing pocket 60 is provided inside the tank shelter 20, and the loading and unloading opening 61 in the housing pocket 60 faces the opening portion 21 of the tank shelter 20. Thus, a space S for storage (FIG. 5) which space is obtained by the housing pocket 60 is not limited by the size of the shelter lid 50 (FIG. 2), and the space S for storage from which the shelter lid 50 is opened easily even when a heavy item is stored in the space S can be obtained.

As shown in FIG. 4, the tank shelter 20 is a cover that can be divided into a plurality of covers, that is, a three-division structure of a center portion 30 and two side portions 40(L) and 40(R). The opening portion 21 is opened in the center portion 30. The width W1 of the opening portion 21 is set smaller than a width between joints 30L and 30R joined to the two side portions 40(L) and 40(R) in the center portion 30.

The housing pocket 60 is fixed to the inside of the center portion 30, as will be described later. The dimension (W2) in the direction of vehicle width of the housing pocket 60 is larger than the width between the joints 30L and 30R joined to the two side portions 40(L) and 40(R) in the center portion 30.

Such a construction allows the width W2 of the housing pocket 60 to be widened. In addition, attachment accuracy is improved because the housing pocket 60 is attached to one part (center portion 30).

There is a desire to construct the tank shelter 20 from a plurality of divided parts because the tank shelter 20 is a relatively large part covering the upper surface and both side surfaces of the vehicle.

According to an embodiment of the present embodiment, the tank shelter 20 is formed by a cover that can be divided into a plurality of covers (30, 40(L), and 40(R)). Therefore, the tank shelter 20 can be easily manufactured.

On the other hand, the opening portion 21 opposed to the fuel filler 71 of the fuel tank 70 needs to be provided to the tank shelter 20. There is another desire to house the opening portion 21 in one part without the opening portion 21 straddling a plurality of parts in consideration of the continuousness (juncture and fitting accuracy) of a shelter surface 20s. There is thus a limitation on the width W1 (FIG. 4) of the opening portion 21.

In order to deal with this, according to the present embodiment, the housing pocket 60 is fixed to the inside of the tank shelter 20, and therefore the width W2 of the housing pocket 60 can be made to be larger than the width W1 of the opening portion 21. In addition, because the loading and unloading opening 61 in the housing pocket 60 faces the opening portion 21 of the tank shelter 20, the ease of loading and unloading can be enhanced.

As shown in FIG. 2 and FIGS. 8 to 11(b), the center portion 30 of the tank shelter 20 is a curved cover member covering the upper portions of the housing pocket 60 and the fuel tank 70. The center portion 30 has a curved top plate 31 and a left side plate 32 and a right side plate 32 extending downwardly integrally with the top plate 31 from a left side and a right side, respectively, of the top plate 31.

Figure 14A:
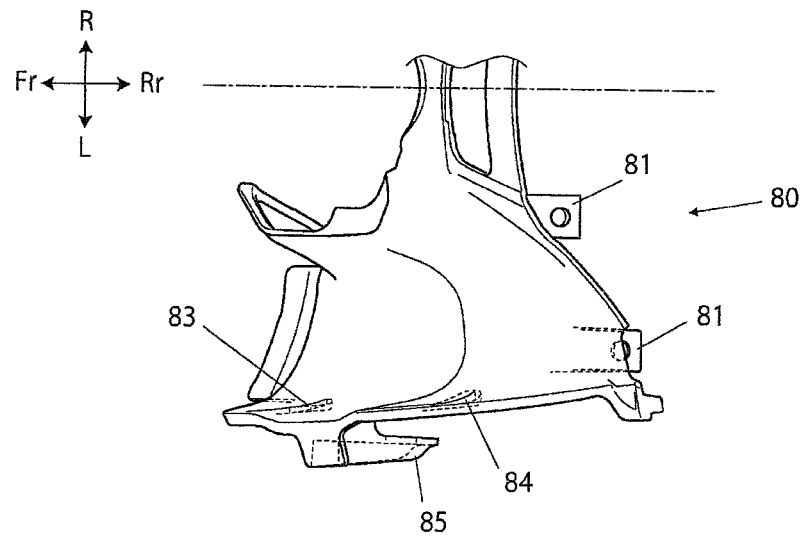
FIGS. 14(a) and 14(b) are diagrams showing a front cover 80, 14(a) being a partially omitted plan view, and 14(b) being a left side view.
Figure 14B:
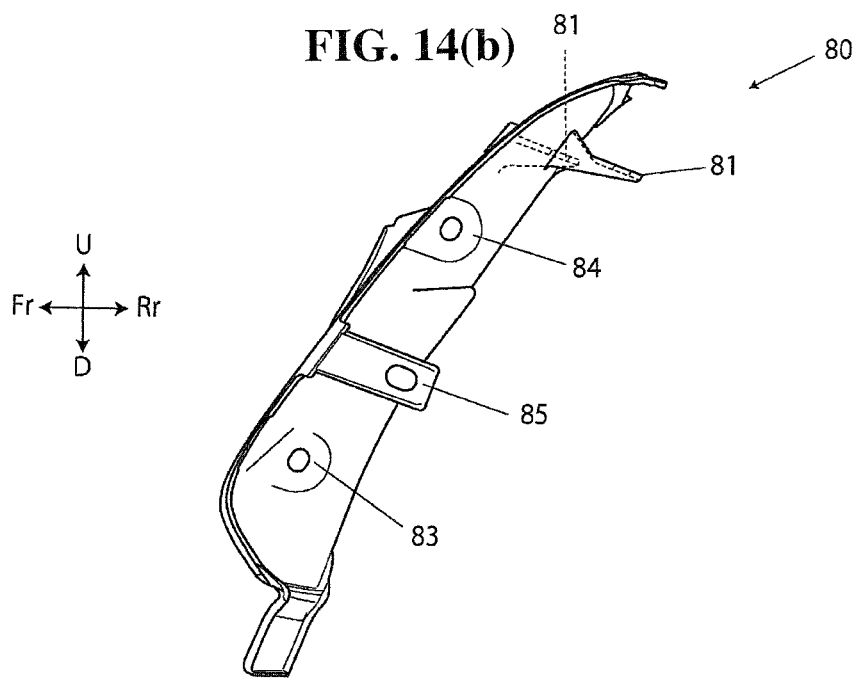
Figure 17:
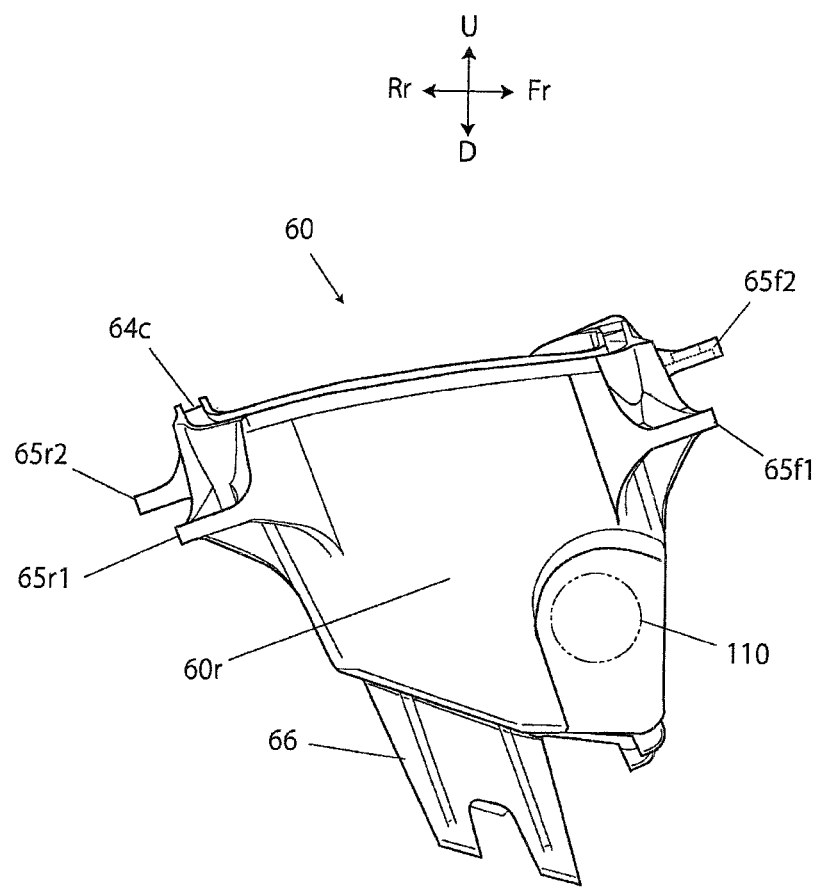
FIG. 17 is a right side view of the housing pocket 60.
Figure 18A:
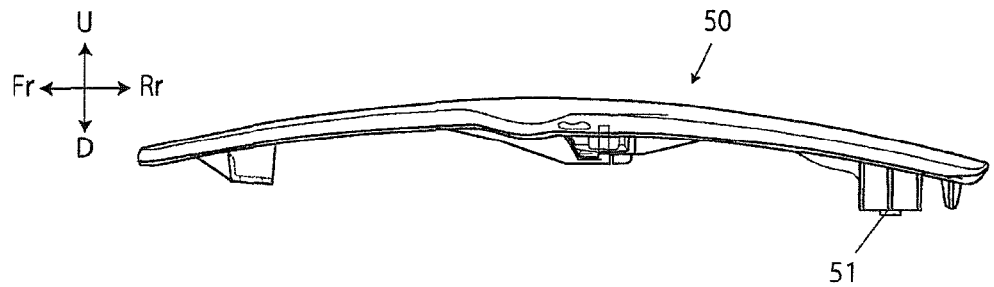
FIGS. 18(a) to 18(e) are diagrams showing the shelter lid 50, 18(a) being a left side view, 18(b) being a bottom view of 18(a), 18(c) being a sectional view taken along a line y-y, 18(d) being a sectional view taken along a line x-x, and 18(e) being a sectional view taken along a line z-z.
Figure 18C:
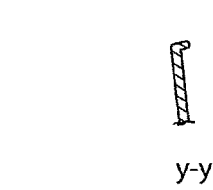
Figure 18D:
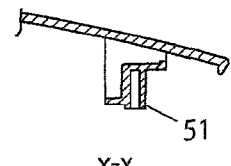
Figure 18B:
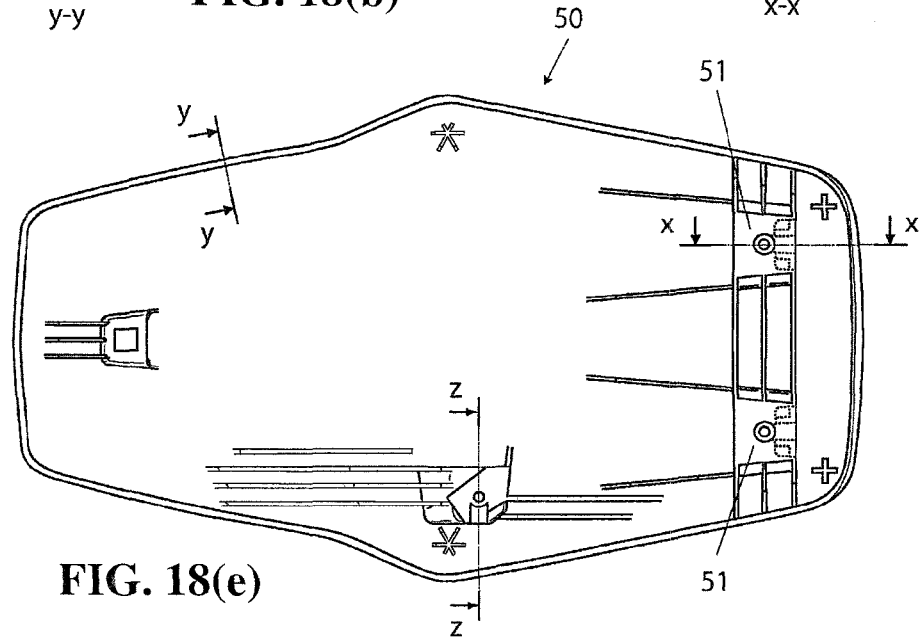
Figure 18E:
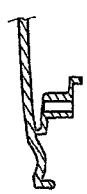

Fixing portions 31p (only two fixing portions 31p on the left side are shown in the plan view of FIG. 9) for attaching portions 81 of a front cover 80 (FIGS. 14(a) and 14(b)) forming a front portion of the tank shelter 20 are provided to the left and right of a front portion of the top plate 31.

The side plates 32 have a plurality of positioning holes 32h (five positioning holes 32h are shown in the figure) to be fitted with a plurality of positioning projection portions 42p (FIGS. 12(a) to 12(d) and FIGS. 13(a) to 13(d)) (five positioning projection portions 42p are shown in the figures) provided to the two side portions 40(L) and 40(R) and fixing holes 32h1 to 32h5 to be engaged with fixing projections 42p1 to 42p5 (FIGS. 12(a) to 12(d) and FIGS. 13(a) to 13(d)) provided to the two side portions 40(L) and 40(R).

Fastening fixing portions 33 to be fastened to a vehicle body frame are provided to both ends of a rear portion of the center portion 30.

A coupling portion 37 for coupling to the seat 12 is provided.

The two side portions 40(L) and 40(R) have a symmetrical shape, and are cover members covering the housing pocket 60 and regions of the fuel tank 70 from both side portions of the upper portion of the fuel tank 70 to sides of the fuel tank 70, as shown in FIG. 4, FIGS. 12(a) to 12(d) and FIGS. 13(a) to 13(d). In addition, FIGS. 12(a) to 12(d) and FIGS. 13(a) to 13(d) show the side portion 40(L) on the left side, and the side portion 40(R) on the right side forms a structure symmetrical to the side portion 40(L) on the left side.

The two side portions 40(L) and 40(R) have the above-described positioning projection portions 42p, the above-described fixing projections 42p1 to 42p5, and fixing portions 43 and 44 for attaching portions 83 and 84 (only the attaching portions 83 and 84 on the left side are shown in FIGS. 14(a) and 14(b0) of the front cover 80.

Figure 5:
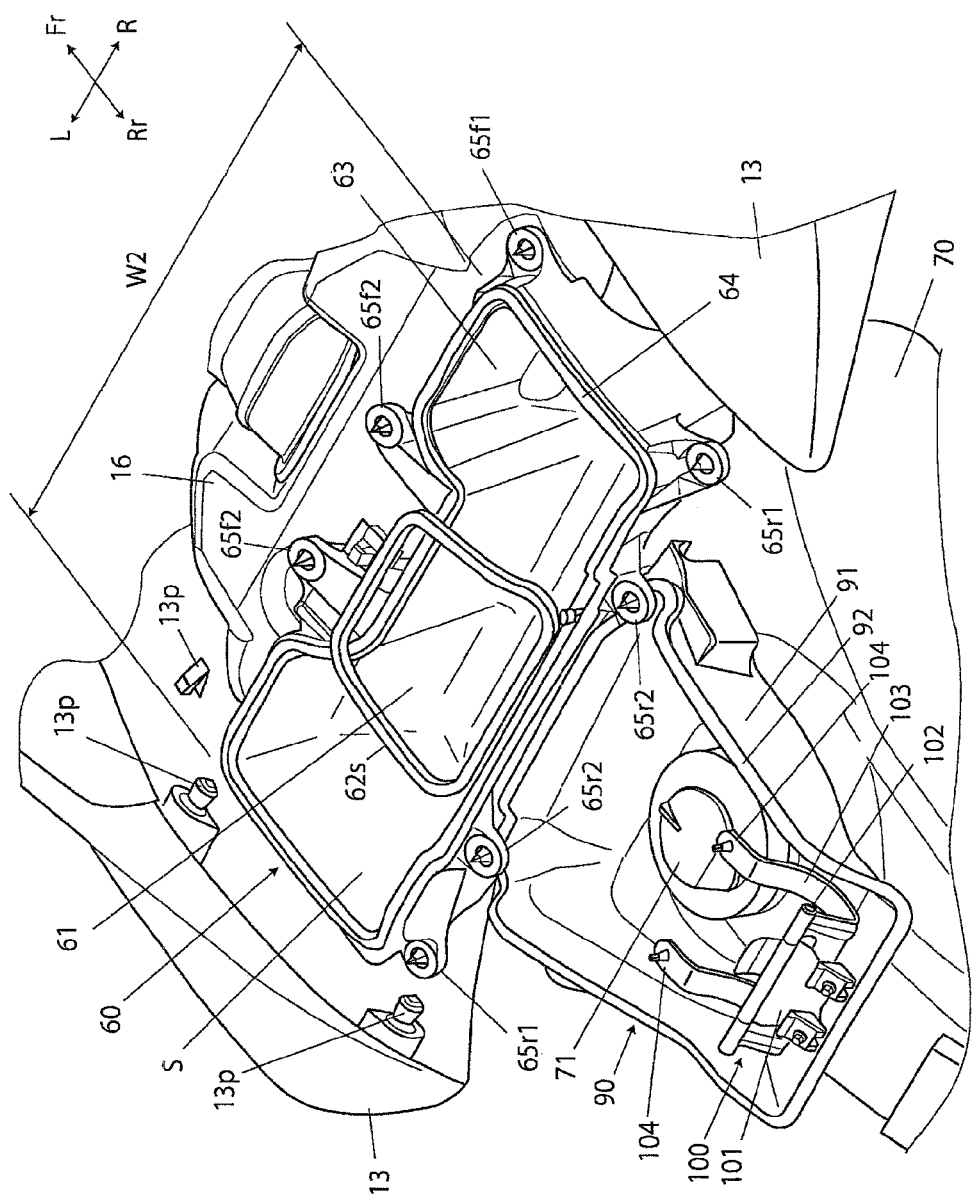
FIG. 5 is a perspective view of a housing pocket 60, a refueling tray 90, and the like with the tank shelter 20 removed.

In addition, in FIGS. 12(a) to 12(d) and FIGS. 13(a) to 13(d), coupling holes 45 are provided to be engaged with coupling projections 13p (only three coupling projections 13p are shown in FIG. 5) in a cowling 13 (FIG. 1), coupling portions 46 for coupling to a side cover 14 (FIG. 1), and a coupling portion 47 for coupling to the seat 12.

The front cover 80 shown in FIGS. 14(a) and 14(b) is a member covering the front portion of the tank shelter 20. The front cover 80 has fixing portions 85, 85 (only the fixing portion 85 on the left side is shown) to be fixed to the frame via a bracket not shown in FIGS. 14(a) and 14(b), the above-described attaching portions 81 for the center portion 30, and the above-described attaching portions 83 and 84 for attaching the two side portions 40(L) and 40(R).

The tank shelter 20 is attached to the vehicle body frame by coupling the fixing portions 31p in the front portion of the center portion 30 to the attaching portions 81 of the front cover 80 fixed to the vehicle body frame (see FIG. 6 and FIG. 7), fastening and fixing the fixing portions 33 in the rear portion of the center portion 30 to the vehicle body frame, fixing the two side portions 40(L) and 40(R) to both sides of the center portion 30 by engaging the fixing projections 42p1 to 42p5 of the two side portions 40(L) and 40(R) with the fixing holes 32h1 to 32h5 of the center portion 30 while fitting and positioning the positioning projection portions 42p of the two side portions 40(L) and 40(R) in the positioning holes 32h of the center portion 30, and coupling and fixing the coupling portions 47 of the two side portions 40(L) and 40(R) to the seat 12 by fastening the coupling portions 47 of the two side portions 40(L) and 40(R) to the seat 12 together with the coupling portions 37 of the center portion 30.

The coupling projections 13p of the cowling 13 are engaged with the coupling holes 45 for the cowling 13, whereby the cowling 13 is coupled on the outside of the two side portions 40(L) and 40(R). The side cover 14 is coupled to the coupling portions 46 for the side cover 14.

As shown in FIGS. 8 to 11(b), the center portion 30 of the tank shelter 20 has eaves portions 34, 34 under the joints 30L and 30R to be joined to the side portions, which eaves portions 34, 34 extend according to the length in the direction of vehicle width of the housing pocket 60 and to which eaves portions 34, 34 the housing pocket 60 is fixed.

Such a construction allows the dimension in the direction of vehicle width of the housing pocket 60 to be larger than the width between the joints 30L and 30R to be joined to the two side portions in the center portion 30, and at the same time, the fixing of the housing pocket 60 to the eaves portions 34, 34 provides a stable fixed state of the housing pocket 60 fixed to the center portion 30 and a stable property of sealing the housing pocket 60.

As shown in FIGS. 8 to 10(c), the center portion 30 of the tank shelter 20 has fixing portions 35f1, 35f2, 35r1, and 35r2 for the housing pocket 60 on the left and the right (only the fixing portions on the left side are shown in FIGS. 9(a) to 9(g)).

As shown in FIGS. 15(a) to 17, the housing pocket 60 has fixing portions 65f1, 65f2, 65r1, and 65r2 at positions corresponding to the above fixing portions 35f1, 35f2, 35r1, and 35r2 on the left and the right.

The housing pocket 60 is fixed to the center portion 30 of the tank shelter 20 by fastening and fixing the fixing portions 65f1, 65f2, 65r1, and 65r2 of the housing pocket 60 to the fixing portions 35f1, 35f2, 35r1, and 35r2, respectively, of the center portion 30 of the tank shelter 20.

As shown in FIG. 3, FIG. 4, and FIG. 6, the loading and unloading opening 61 of the housing pocket 60 is provided with a pocket lid 62 for opening and closing the loading and unloading opening 61.

Such a construction can prevent fuel from being splashed onto a load within the housing pocket 60 at a time of refueling.

The pocket lid 62 has base portions 62b, 62b (FIG. 3) rotatably supported by shaft portions 36, 36 provided to the center portion 30 of the tank shelter 20 (FIG. 8 and FIGS. 9(a) to 9(g)), so that the pocket lid 62 can be opened or closed by pulling up or down a tab portion 62t.

The center portion 30 of the tank shelter 20 has an engaging pawl 39. The pocket lid 62 has an engaging hole 62h that can be engaged with and detached from the engaging pawl 39. The pocket lid 62 can be formed of a flexible synthetic resin.

As shown in FIG. 4 and FIG. 5, an opening portion 63 of the housing pocket 60 is provided with an annularly continuous housing pocket seal 64 that seals the opening portion 63 in relation to the inner surface of the tank shelter 20 (center portion 30).

In addition, an opening portion 21b (FIG. 8, FIGS. 9(a) to 9(g), and the like) in the center portion 30 which opening portion 21b communicates with the housing pocket 60 is provided with an annularly continuous pocket lid seal 62s that seals the opening portion 21b in relation to the inner surface of the pocket lid 62.

With such a construction, the space S within the housing pocket 60 is divided from the fuel tank 70.

In addition, as shown in FIGS. 15(a) to 17, the housing pocket 60 can be formed without an upper surface (opened upward), and can therefore be molded easily (a need for a slide mold is eliminated).

In addition, in FIGS. 15(a) to 17, a recessed groove 64c is provided in which the housing pocket seal 64 is mounted.

In FIG. 8 and FIGS. 9(a) to 9(g), a frame portion 36s includes a projecting cross-sectional shape on which frame portion the pocket lid seal 62s is mounted.

As shown in FIG. 6, the fuel tank 70 is disposed to the rear of the tank shelter 20. The housing pocket 60 is disposed in a region A1 obtained by obliquely cutting the front side of the fuel filler 71 of the fuel tank 70. The loading and unloading opening 61 is opened in the vicinity of the fuel filler 71 (see FIG. 4).

Such a construction allows the housing pocket 60 to be disposed while a region as an air layer portion in the fuel tank 70 (region A1 obtained by obliquely cutting the front side of the fuel filler 71) is utilized effectively, and at the same time, brings the fuel filler 71 and the loading and unloading opening 61 close to each other, so that the shelter lid 50 can be miniaturized.

An air cleaner 16 is provided in front of the housing pocket 60 within the tank shelter 20.

As shown in FIG. 8 and FIGS. 9(a) to 9(g), a downward hanging wall 21f is disposed on the periphery of the opening portion 21 in the tank shelter 20.

As shown in FIG. 4 and FIG. 5, a refueling tray 90 disposed around the fuel filler 71 on the upper surface of the fuel tank 70 to receive a spilt fuel is larger in size than the opening portion 21 as viewed in plan, and the height of an upper end 92 of an upward peripheral wall 91 of the refueling tray 90 is equal to or smaller than the height of a lower end 21f1 of the hanging wall 21f of the opening portion 21.

Such a construction eliminates a fear of the hanging wall 21f of the tank shelter 20 and the peripheral wall 91 of the refueling tray 90 interfering with each other, and thus eliminates a need to increase the dimensional accuracy of both of the hanging wall 21f of the tank shelter 20 and the peripheral wall 91 of the refueling tray 90. In addition, opening the shelter lid 50 and looking inside does not easily reveal the tank main body 70, so that a simple appearance is presented.

As shown in FIG. 2, a hinge 100 is fixed to the center portion 30 of the tank shelter 20. The shelter lid 50 is rotatably attached to the tank shelter 20 (center portion 30) by the hinge 100.

As shown in FIG. 5, the hinge 100 includes a base portion 101 and an arm 103 having substantially the shape of a letter U as viewed in plan, which arm 103 is rotatably attached to the base portion 101 by a shaft 102.

The base portion 101 is fastened and fixed to fixing portions 38, 38 (FIGS. 9(a) to 11(b)) in the center portion 30 of the tank shelter 20. Fixing portions 51, 51 (FIGS. 18(a) to 18(e)) in the shelter lid 50 are fastened and fixed to end portions 104, 104 of the arm 103 of the hinge 100.

Figure 7:
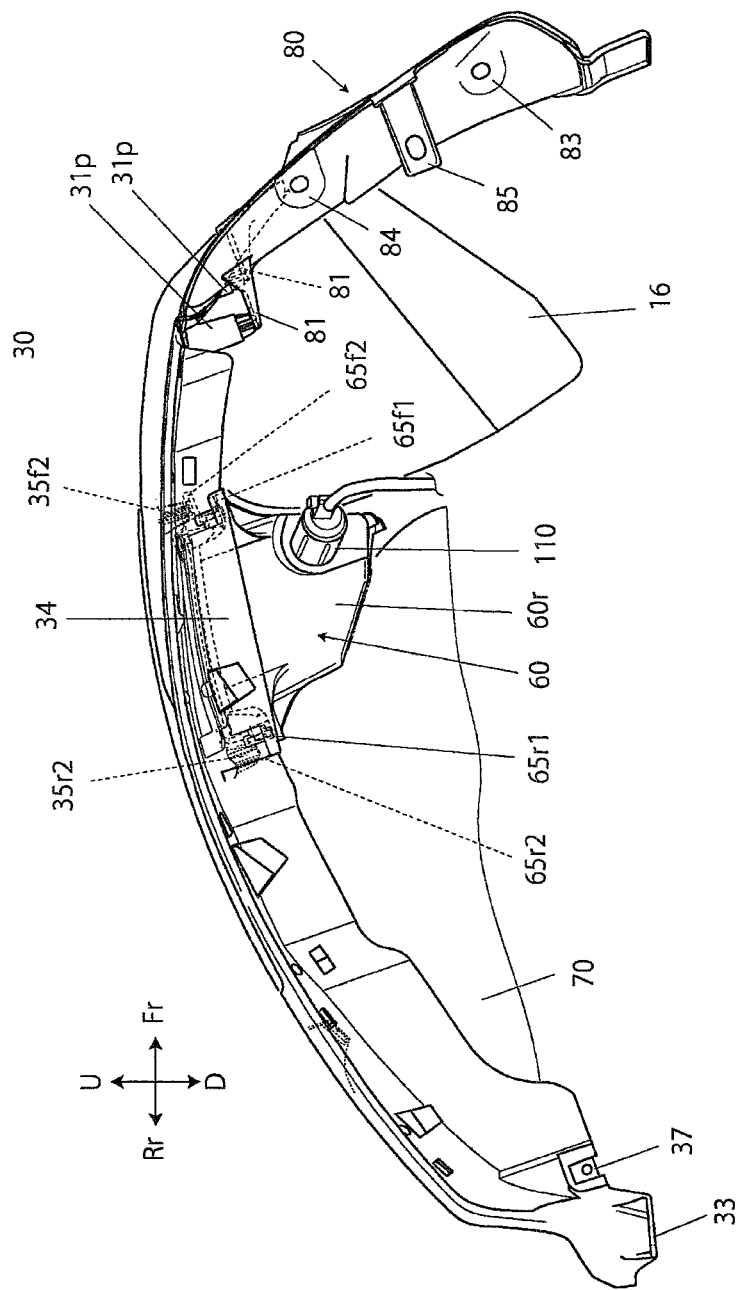
FIG. 7 is a similarly partially omitted right side view.
Figure 8:
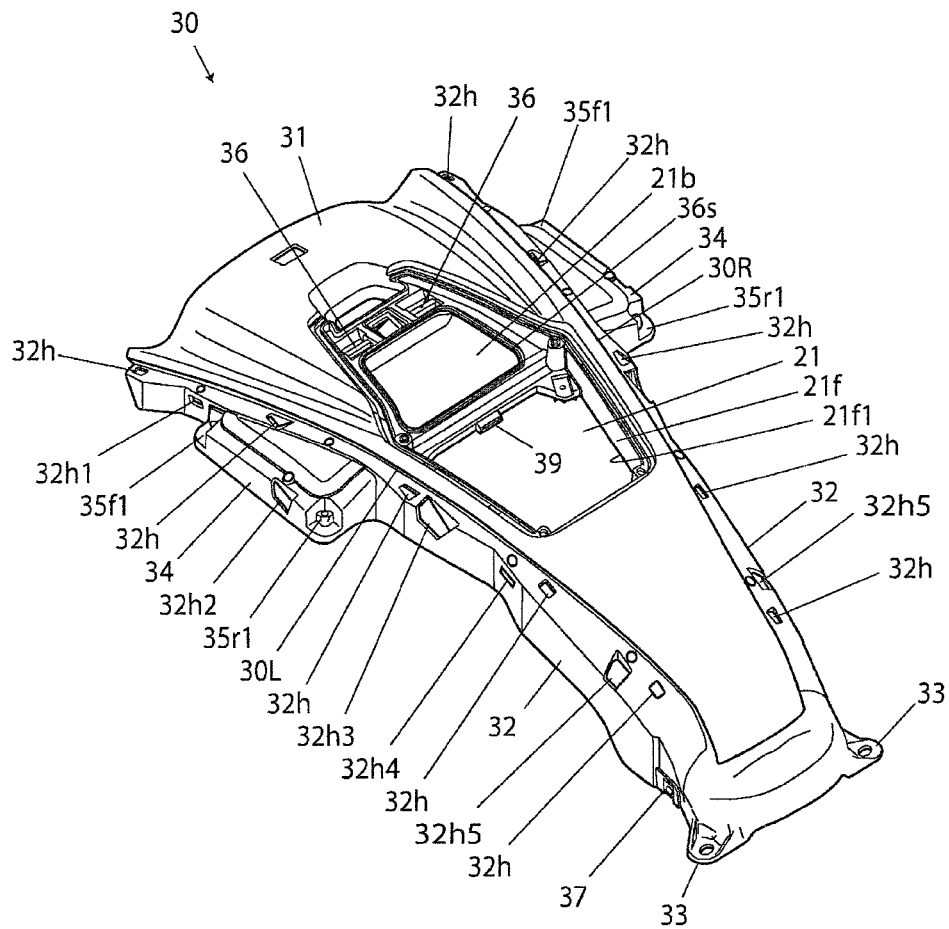
FIG. 8 is a perspective view of a center portion 30.
Figures 11A, 11B:
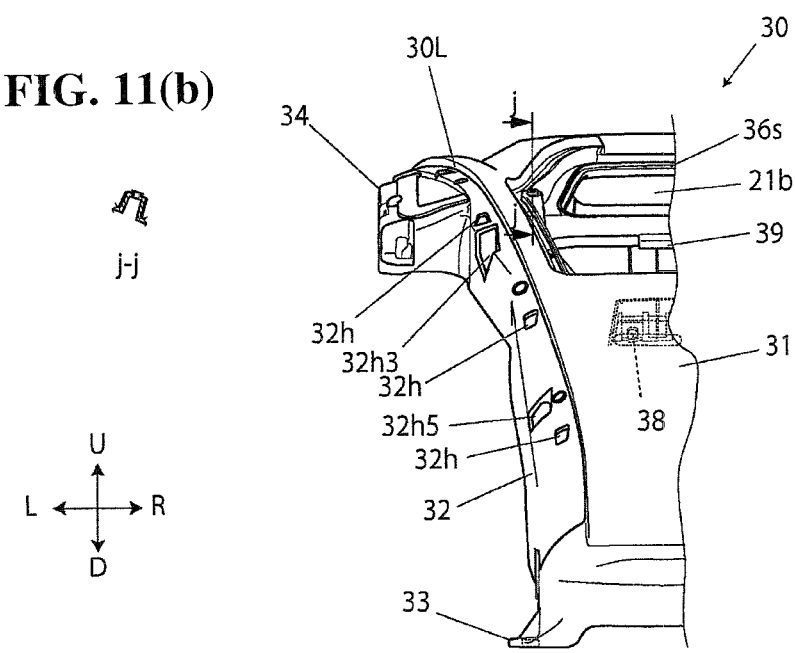
FIGS. 11(a) and 11(b) are diagrams showing the center portion 30, 11(a) being a rear view, and 11(b) being a sectional view taken along a line j-j.

As shown in FIG. 7, an accessory socket 110 is provided to the housing pocket 60. The accessory socket 110 is disposed in a side wall on an opposite side of the housing pocket 60 from a side stand 15 (FIG. 1) provided to the vehicle with respect to the left-right direction of the vehicle. In the present embodiment, the side stand 15 is disposed on the left side of the vehicle. Thus, the accessory socket 110 is disposed in a side wall 60r (see FIGS. 15(a), 15(b) and FIG. 17) on the right side of the housing pocket 60.

Such a construction allows a portable telephone or the like to be charged, for example, using the accessory socket 110. The accessory socket 110 is disposed in the side wall distant from the loading and unloading opening 61 of the housing pocket 60 (side wall 60r on the right side in the present embodiment). Thus, the accessory socket 110 is not easily exposed to rain. In addition, the accessory socket 110 is disposed in the side wall on the opposite side of the housing pocket 60 from the side stand 15 provided to the vehicle 1 with respect to the left-right direction of the vehicle. Thus, during a stop, the accessory socket 110 is positioned in an upward position, and rainwater does not flow into the accessory socket 110.

As shown in FIG. 6 and FIGS. 16(a) and 16(b), the housing pocket 60 has a hanging portion 66. The hanging portion 66 is provided with a hook portion 66f for retaining a hose 93 for guiding a fuel received by the refueling tray 90 to an appropriate position.

An embodiment of the present invention has been described above. However, the present invention is not limited to the foregoing embodiment, but is susceptible of modifications as appropriate within the spirit of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A housing structure in a saddle vehicle having a left side and a right side, the housing structure comprising:
   a tank shelter located between handlebars and a seat mounted on the saddle vehicle, the tank shelter smoothly covering an upper surface and a left and a right side surface of the vehicle between the handlebars and the seat;
   a shelter lid for opening and closing an opening portion opened in an upper surface of the tank shelter;
   a housing pocket into and out of which a load can be placed when the shelter lid is opened, the housing pocket being a compartment dividing a space within the tank shelter, said housing pocket being provided inside the tank shelter;
   a loading and unloading opening in the housing pocket faces the opening portion of the tank shelter with a dimension in a direction of a vehicle width of the housing pocket being larger than a width of the opening portion of the tank shelter in the direction of the vehicle width;
   wherein the tank shelter is a three-division structure including a left side portion disposed adjacent to a center portion and a right side portion disposed adjacent to the center portion opposing the left side portion, the opening portion is opened in the center portion, and the width of the opening portion is set smaller than a width between a left joint member joined to the left side portion of the tank shelter and a right joint member joined to the right side portion of the tank shelter extending along the center portion; and
   wherein a portion of the left side portion extends from the left joint member to the left of the vehicle and a portion of the right side portion extends from the right joint member to the right of the vehicle; wherein a left portion of the housing pocket extends under the left side portion of the tank shelter and a right portion of the housing pocket extends under the right side portion of the tank shelter and are accessible from the opening portion of the tank shelter;
   the housing pocket is fixed to an inside of the center portion of the tank shelter, and the dimension in the direction of the vehicle width of the housing pocket is larger than the width between the left joint member joined to the left side portion of the tank shelter and right joint member joined to the right side portion of the tank shelter.

2. The housing structure in the saddle vehicle according to claim 1, further comprising:
   a pocket lid for opening and closing the loading and unloading opening of the housing pocket.

3. The housing structure in the saddle vehicle according to claim 2,
   wherein the housing pocket is fixed to an inside of the tank shelter, and
   the housing structure further includes:
      an annularly continuous housing pocket seal for sealing the loading and unloading opening of the housing pocket in relation to the tank shelter; and
      an annularly continuous pocket lid seal for sealing the opening portion in the tank shelter, the opening portion in the tank shelter communicating with the housing pocket, in relation to the pocket lid.

4. A housing structure in a saddle vehicle having a left side and a right side, the housing structure comprising:
- a tank shelter located between handlebars rotated and steered by an occupant and a seat straddled by the occupant, the tank shelter smoothly covering an upper surface and both side surfaces of the vehicle between the handlebars and the seat;
- a fuel tank for storing fuel supplied to an engine, at least a fuel filler of the fuel tank being opened upwardly within the tank shelter;
- a shelter lid for opening and closing an opening portion opened in an upper surface of the tank shelter in accordance with the fuel filler;
- a housing pocket into and out of which a load can be placed when the shelter lid is opened, the housing pocket being a compartment dividing a space within the tank shelter;
- wherein the housing pocket is provided inside the tank shelter, a loading and unloading opening in the housing pocket faces the opening portion of the tank shelter, and a dimension in a direction of a vehicle width of the housing pocket is larger than a width of the opening portion of the tank shelter in the direction of the vehicle width;
- wherein the tank shelter is a three-division structure including a left side portion disposed adjacent to a center portion and a right side portion disposed adjacent to the center portion opposing the left side portion, the opening portion is opened in the center portion, and the width of the opening portion is set smaller than a width between a left joint member joined to the left side portion of the tank shelter and a right joint member joined to the right side portion of the tank shelter extending along the center portion; and
- wherein a portion of the left side portion extends from the left joint member to the left of the vehicle and a portion of the right side portion extends from the right joint member to the right of the vehicle; wherein a left portion of the housing pocket extends under the left side portion of the tank shelter and a right portion of the housing pocket extends under the right side portion of the tank shelter and are accessible from the opening portion of the tank shelter;
- the housing pocket is fixed to an inside of the center portion of the tank shelter, and the dimension in the direction of the vehicle width of the housing pocket is larger than the width between the left joint member joined to the left side portion of the tank shelter and right joint member joined to the right side portion of the tank shelter.

5. The housing structure in the saddle vehicle according to claim 1, further comprising:
- a pocket lid for opening and closing the loading and unloading opening of the housing pocket.

6. The housing structure in the saddle vehicle according to claim 5,
- wherein the housing pocket is fixed to an inside of the tank shelter, and
- the housing structure further includes:
  - an annularly continuous housing pocket seal for sealing the loading and unloading opening of the housing pocket in relation to the tank shelter; and
  - an annularly continuous pocket lid seal for sealing the opening portion in the tank shelter, the opening portion in the tank shelter communicating with the housing pocket, in relation to the pocket lid.

7. The housing structure in the saddle vehicle according to claim 6,
- wherein the fuel tank is disposed to a rear of the tank shelter, and
- the housing pocket is disposed in a region obtained by obliquely forming an indentation in a front side of the fuel tank forward of the fuel filler, and the loading and unloading opening is opened in a vicinity of the fuel filler.

8. The housing structure in the saddle vehicle according to claim 5,
- wherein the fuel tank is disposed to a rear of the tank shelter, and
- the housing pocket is disposed in a region obtained by obliquely forming an indentation in a front side of the fuel tank forward of the fuel filler, and the loading and unloading opening is opened in a vicinity of the fuel filler.

9. The housing structure in the saddle vehicle according to claim 5,
- wherein an accessory socket is provided to the housing pocket, and the accessory socket is disposed in a side wall on an opposite side of the housing pocket from a side stand provided to the vehicle with respect to a left-right direction of the vehicle.

10. The housing structure in the saddle vehicle according to claim 5,
- wherein a downward hanging wall is disposed on a periphery of the opening portion in the tank shelter, and
- a refueling tray disposed around the fuel filler on an upper surface of the fuel tank to receive spilt fuel is larger in size than the opening portion as viewed in a plan view, and a height of an upper end of an upward peripheral wall of the refueling tray is equal to or smaller than a height of a lower end of the hanging wall of the opening portion.

11. The housing structure in the saddle vehicle according to claim 4,
- wherein the center portion of the tank shelter has an eaves portion under the joints joined to the side portions, the eaves portion extending according to a length in the direction of vehicle width of the housing pocket, and the housing pocket being fixed to the eaves portion.

12. The housing structure in the saddle vehicle according to claim 4,
- wherein the fuel tank is disposed to a rear of the tank shelter, and
- the housing pocket is disposed in a region obtained by obliquely forming an indentation in a front side of the fuel tank forward of the fuel filler, and the loading and unloading opening is opened in a vicinity of the fuel filler.

13. The housing structure in the saddle vehicle according to claim 4,
- wherein an accessory socket is provided to the housing pocket, and the accessory socket is disposed in a side wall on an opposite side of the housing pocket from a side stand provided to the vehicle with respect to a left-right direction of the vehicle.

14. The housing structure in the saddle vehicle according to claim 4,
- wherein a downward hanging wall is disposed on a periphery of the opening portion in the tank shelter, and
- a refueling tray disposed around the fuel filler on an upper surface of the fuel tank to receive spilt fuel is larger in size than the opening portion as viewed in a plan view, and a height of an upper end of an upward peripheral wall of the refueling tray is equal to or smaller than a height of a lower end of the hanging wall of the opening portion.

* * * * *